March 29, 1932. J. R. FOLEY 1,851,505
METHOD AND APPARATUS FOR MOLDING HOLLOW RINGS OF RUBBER OR THE LIKE
Filed May 20, 1930 2 Sheets-Sheet 1
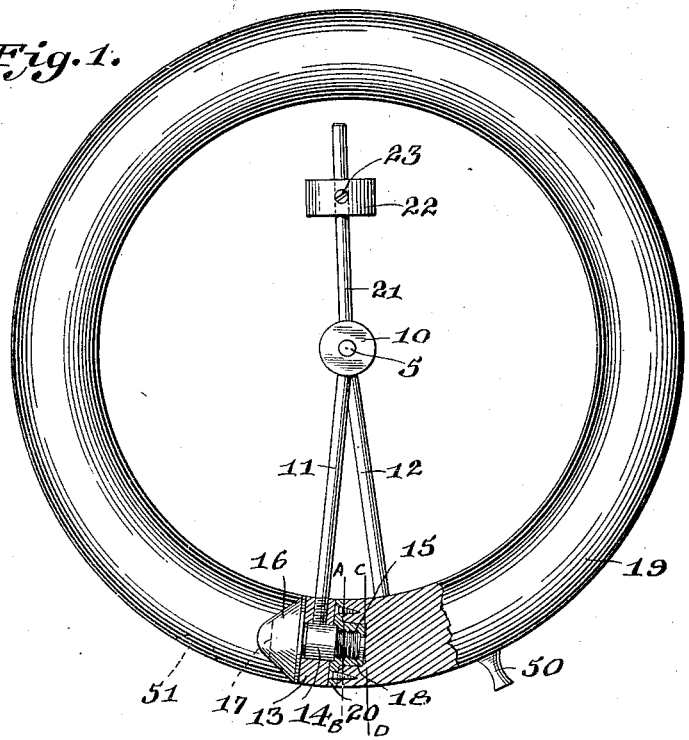
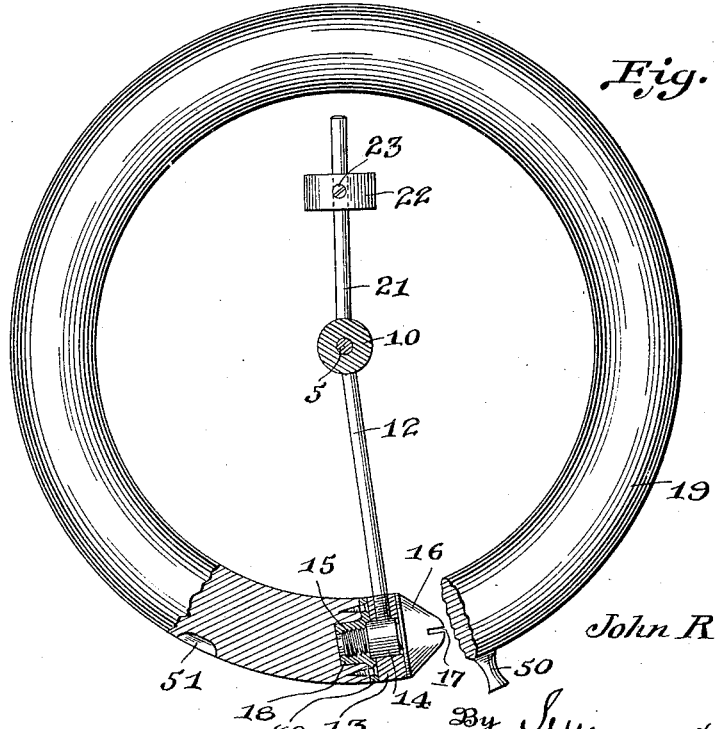
Inventor
John R. Foley
By Seymour & Bright
Attorneys March 29, 1932.  J. R. FOLEY  1,851,505
METHOD AND APPARATUS FOR MOLDING HOLLOW RINGS OF RUBBER OR THE LIKE
Filed May 20, 1930   2 Sheets-Sheet 2
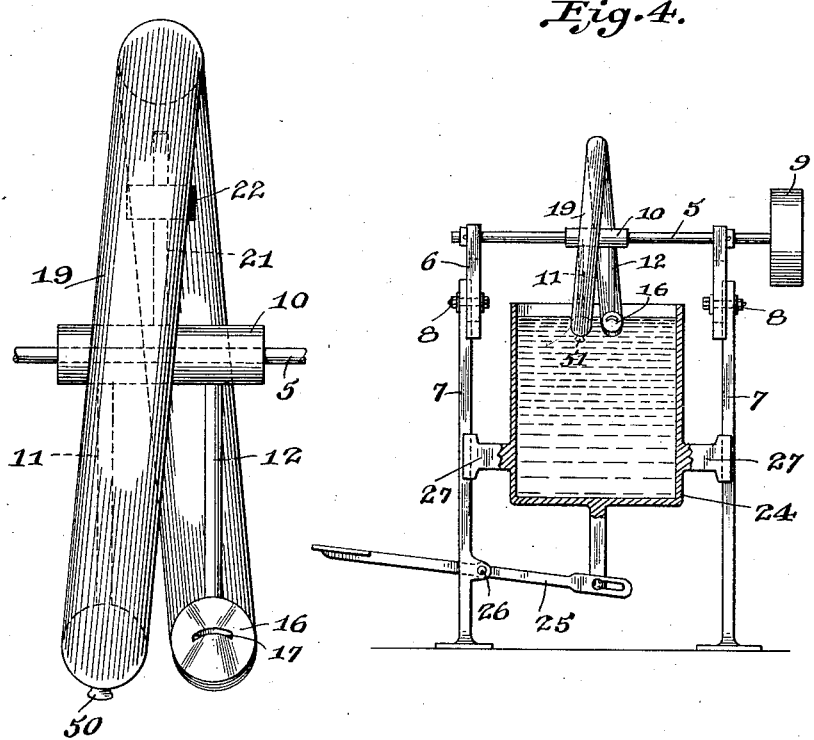
Inventor
John R. Foley
By Seymour & Bright
Attorneys Patented Mar. 29, 1932

1,851,505

UNITED STATES PATENT OFFICE

JOHN RUSSELL FOLEY, OF NEW YORK, N. Y.

METHOD AND APPARATUS FOR MOLDING HOLLOW RINGS OF RUBBER OR THE LIKE

Application filed May 20, 1930. Serial No. 454,103.

This invention relates to improvements in methods and apparatus for molding hollow rings of rubber or the like, and while the invention has been developed specifically for the making of swimming rings or circular life preservers, it will be manifest to those skilled in the art that it may be used in the manufacture of inner tubes for tires or the like.

In accordance with the invention, a helical or spherical mandrel is detachably mounted upon a revolving shaft, and while the mandrel is rotated with the shaft, the lower portion of the mandrel is dipped into fluid latex, so as to completely cover the mandrel with such plastic material, and afterwards, the rotating mandrel is either raised, or the latex tank is lowered to such an extent that the mandrel in its subsequent rotation, will dip only partially into the plastic material, and in this way, the peripheral portion of the molded ring may be thickened. Afterwards, the molded tube is cut along certain radial lines, to facilitate the detachment of the mandrel from its rotatable support, and then the tube may be stripped from the mandrel, and the ends of the tube may be overlapped and secured together to form a swimming ring or the like.

A salient object of the invention is to provide an improved method and apparatus for molding rubber rings or the like in the manner above set forth.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is a side elevation, partly in section, of the improved mandrel and its support.

Fig. 2 is a similar view with the forward end portion of the mandrel cut away to illustrate the manner in which the rear end portion of the mandrel is secured to the rotatable support.

Fig. 3 is an edge view of the mandrel.

Fig. 4 is a more or less diagrammatic view of one form of the complete apparatus.

Referring to the drawings, 5 designates a rotatable shaft which is mounted in vertically adjustable bearings 6, that are supported by standards 7, and may be secured in adjusted positions, by any suitable means, such as bolts 8. The shaft may be driven by any suitable means, through the instrumentality of a gear 9 which is mounted on the shaft.

A hub 10 rotates with the shaft and is provided with two arms 11 and 12 which project from the shaft in the same general direction, but diverge outwardly, as shown in Figs. 1 and 2.

Each arm or spoke is provided at its outer end with a collar 13 having a ferrule 14 to receive the shank of a screw 15. The head of each screw is preferably of conical form, as shown at 16, and is provided with a groove 17 to receive a screw-driver or the like.

These screws are designed to be connected to threaded sockets 18 which are secured to the offset overlapping ends of the helical mandrel 19, by any suitable means, such as screws 20. This construction allows the mandrel to be rigidly supported by the rotatable shaft, with the mandrel concentric to the axis of the shaft.

The mandrel may be of any suitable shape circumferentially, but it is preferred to have the same of circular cross section.

An arm 21 projects from the hub in a direction opposite to the arms 11 and 12, and the arm 21 slidably supports a counter-weight 22, which may be secured to the arm by any suitable means, such as a screw 23. This weight will counter-balance the mandrel during the rotation of the shaft.

When the mandrel has been mounted on the spokes 11 and 12 by means of the screws 15, the lower portion of the rotating mandrel may be dipped into any suitable plastic fluid in a tank 24. The dipping may be accomplished by means of the bearings 6, that is, such bearings may be lowered to cause the lower portion of the rotating mandrel to be completely submerged in the plastic material, and then the bearings may be fixed in this position by the bolts 8. On the other hand, if desired, instead of lowering the shaft 5, the tank 24 may be elevated by any suitable means for this purpose. For example, the tank may be raised by means of a foot lever 25, which is pivotally mounted at 26 on one of the standards 7. Guides 27 may be used to guide the tank in its vertical movements.

After the shaft 5 has been rotated for a sufficient length of time to completely submerge the lower portion of the mandrel in the plastic material to deposit one or more coats on the mandrel, the shaft may be raised, or the tank may be lowered so as to permit only a part of the lower portion of the mandrel to be dipped into the plastic material during the rotation of the mandrel, for the purpose of increasing the thickness of the coat on the peripheral portion of the mandrel. In this way, a shaped circular rubber tube may be made by the so-called "latex dip" process.

The invention has been evolved as a result of determining an economical manner of manufacturing swimming rings or circular life preservers. Its development, while perfecting and making practical the manufacture of such articles, at the same time embodies a very feasible method for manufacturing inner tubes, and regardless of the purpose for which it is used, after the rubber tube has been molded on the mandrel, either the shaft 5 is raised, or the tank 24 is lowered to allow the detachment of the mandrel from its rotating support. After either one of the parts 5 or 24 has been moved relatively to the other, to permit the detachment of the mandrel, the rubber is severed along the lines A—B and C—D, and then the ends of the rubber tube which enclose the parts 13 and 16, are stripped from the ends of the mandrel. Then the screws 15 are removed to disconnect the ends of the mandrel from the collars 13, and the mandrel is detached from its rotatable support. Of course, a similar mandrel can immediately be attached to the rotatable support for a subsequent molding operation.

After the coated mandrel is removed, the rubber tube is stripped therefrom, and as the ends of the mandrel overlap circumferentially, the ends of the rubber tube may also be overlapped and be secured together by vulcanizing or the like, for the purpose of forming a complete swimming ring or like article.

In practice, after the mandrel has been mounted on its rotatable support, the next step is to pass the mandrel, while revolving, through liquid latex, for the time necessary to accomplish the particular purpose required. In revolving the mandrel through the latex, the degree of its submersion is dependent on the nature of the article being manufactured. The process implies complete submersion, sufficient to cover the surface of the mandrel, or in other words, the lower section of the mandrel is completely submerged in the latex, while the remainder of the mandrel is exposed to atmosphere.

When sufficient latex for the purpose has adhered to the mandrel, the complete submersion will be terminated by either lifting the mandrel as a whole, or lowering the latex solution. The revolving of the mandrel on its axis is continued until such time as the latex on it has become set or fixed.

Due to the rotation of the mandrel, the so-called drops or ridges created by liquid latex are eliminated.

In order that the air valve may be attached to the ring after the latter is molded, the mandrel is provided near one of its ends with a projecting post 50, and the opposite end portion of the mandrel is furnished with a cavity 51. Consequently, while the ring is being molded, an aperture will be provided in the same where the pin 50 is located, and a thickened portion will be provided where the cavity 51 is positioned. Then, after the ring is stripped from the mandrel, and its ends are overlapped, the air valve may be attached at the points where the thickened portion registers with the aperture.

From the foregoing it is believed that the invention may be readily understood by those skilled in the art, and it is apparent that changes may be made in the details disclosed, without departing from the spirit of the invention, as expressed in the claims.

What is claimed and desired to be secured by Letters Patent is:

1. A method of manufacturing circular tubes, comprising rotating a helical mandrel about a horizontal axis while the lower section of the mandrel is substantially submerged in a pool of a rubber solution, and the remaining portion of the same is above the pool and in the atmosphere, continuing the rotation of the mandrel until a coat of the rubber solution of the desired thickness is deposited on the mandrel, and after the coating has set, stripping the resulting rubber tube from the mandrel and overlapping and connecting the ends of said tube.

2. A method as claimed in claim 1, in which the mandrel is submerged in the pool to varying degrees during the rotation of the mandrel, to provide a thicker coat of the rubber solution on certain portions of the mandrel.

3. An apparatus of the character described, comprising a helical mandrel member, a support for the mandrel rotatable about a horizontal axis, a tank member adapted to contain a rubber solution into which the mandrel dips while rotating, and means for moving one of said members toward or away from the other member for varying the depth of submersion of the mandrel in the pool of solution contained in the tank.

4. An apparatus of the character described, including rotatable supporting means, a helical mandrel, and means for detachably connecting the ends of the mandrel to said supporting means.

5. An apparatus of the character described, including rotatable supporting means, and a helical mandrel carried by the supporting means and having its ends offset and overlapping each other.

6. A rubber ring molding apparatus, including rotatable supporting means, a helical mandrel, and screws detachably connecting the ends of the mandrel to the supporting means.

7. A rubber ring molding apparatus, including rotatable supporting means, a helical mandrel, screws detachably connecting the ends of the mandrel to the supporting means, and counter-balancing means connected to the supporting means for counter-balancing the mandrel.

8. A rubber ring molding apparatus, comprising a rotatable shaft, arms projecting from the shaft, a helical mandrel concentric with the axis of the shaft, and means detachably connecting the ends of the mandrel to said arms.

9. A rubber ring molding apparatus comprising a rotatable shaft, diverging arms projecting from the shaft, a helical mandrel concentric with the axis of said shaft, and means for detachably securing said arms to the ends of the mandrel.

10. A rubber ring molding apparatus comprising a rotatable shaft, diverging arms projecting from the shaft, a helical mandrel arranged concentrically to the axis of the shaft, and having offset overlapping ends, and means detachably connecting the outer ends of the arms to the ends of the mandrel.

11. A rubber ring molding apparatus, comprising a rotatable shaft, diverging arms projecting from the shaft, ferrules supported by the arms, a helical mandrel arranged concentrically to the axis of said shaft and having overlapping ends, and screws detachably connecting the ferrules to the ends of the mandrel.

12. An apparatus of the character described, comprising means rotatable about a horizontal axis, diverging arms movable with and projecting from said means, a helical mandrel arranged concentric to said axis and having overlapping ends, and quick detachable means joining said arms to the ends of the mandrel.

13. An apparatus of the character described, comprising means rotatable about a horizontal axis, diverging arms movable with and projecting from said means, a helical mandrel arranged concentric to said axis and having overlapping ends, quick detachable means joining said arms to the ends of the mandrel, a third arm projecting from the first mentioned means in a direction opposite to that of the diverging arms, and a weight adjustably mounted on the third arm for counter-balancing said mandrel.

14. An apparatus of the character described, comprising a hub rotatable about a horizontal axis, diverging arms movable with and projecting from said hub, rings connected to the outer ends of the arms, a helical mandrel arranged concentrically to said axis, and having offset overlapping ends, a threaded socket secured to each end of the mandrel, and threaded fastening devices passing through said rings and engaging said sockets for detachably connecting the mandrel to said rings.

In testimony wherof, I have signed this specification.

JOHN RUSSELL FOLEY.